United States Patent
Haag et al.

(10) Patent No.: US 12,481,059 B2
(45) Date of Patent: Nov. 25, 2025

(54) ULTRASONIC SENSOR SYSTEM FOR A MOTOR VEHICLE AND METHOD FOR OPERATING THE ULTRASONIC SENSOR SYSTEM

(71) Applicant: Valeo Schalter und Sensoren GmbH, Bietigheim-Bissingen (DE)

(72) Inventors: Fabian Haag, Bietigheim-Bissingen (DE); Denis Aschkenasi, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 155 days.

(21) Appl. No.: 18/256,137

(22) PCT Filed: Dec. 1, 2021

(86) PCT No.: PCT/EP2021/083674
§ 371 (c)(1),
(2) Date: Jun. 6, 2023

(87) PCT Pub. No.: WO2022/122490
PCT Pub. Date: Jun. 16, 2022

(65) Prior Publication Data
US 2024/0036194 A1  Feb. 1, 2024

(30) Foreign Application Priority Data
Dec. 8, 2020  (DE) .................... 10 2020 132 634.3

(51) Int. Cl.
*G01S 15/931* (2020.01)
*G01S 7/52* (2006.01)
*G01S 15/08* (2006.01)

(52) U.S. Cl.
CPC ........ *G01S 15/931* (2013.01); *G01S 7/52004* (2013.01); *G01S 15/08* (2013.01); *G01S 2007/52007* (2013.01)

(58) Field of Classification Search
CPC .... G01S 7/52004; G01S 15/08; G01S 15/931; G01S 2007/52007
See application file for complete search history.

(56) References Cited

U.S. PATENT DOCUMENTS 5,991,234 A * 11/1999 Sejalon ................. B06B 1/0246
367/13
9,423,291 B2 * 8/2016 Jurzitza ................. B06B 1/0261
(Continued)

FOREIGN PATENT DOCUMENTS

CN  107957580 A  4/2018
DE  102012200743 A1  7/2013
(Continued)

OTHER PUBLICATIONS

International Search Report issued in International Patent Application No. PCT/EP2021/083674 mailed on Mar. 25, 2022 (5 pages).
(Continued)

*Primary Examiner* — Daniel L Murphy
*Assistant Examiner* — Amie M Ndure
(74) *Attorney, Agent, or Firm* — Osha Bergman Watanabe & Burton LLP

(57) ABSTRACT

Proposed is an ultrasonic sensor system (1) for a motor vehicle (11), comprising an ultrasonic sensor (2) and a test control device (10). The ultrasonic sensor (2) comprises an electroacoustic converter arrangement (7) for generating and detecting ultrasonic waves and an electric test device (8), which is designed to output an electric test signal to the electroacoustic converter arrangement (7) and to detect an electric response signal of the electroacoustic converter
(Continued)

arrangement (7) to the electric test signal. The test control device (10) is designed to detect a characteristic variable of the electric response signal at a plurality of measurement points (14, 15) by means of the electric test device (8) by varying a frequency and an amplitude of the electric test signal.

10 Claims, 4 Drawing Sheets

(56) References Cited

U.S. PATENT DOCUMENTS

| | | | | |
|---|---|---|---|---|
| 11,666,194 | B2* | 6/2023 | Park | A47L 9/2852 |
| | | | | 15/319 |
| 2007/0107516 | A1* | 5/2007 | Fujimoto | G01N 29/036 |
| | | | | 73/579 |
| 2010/0319456 | A1* | 12/2010 | Ume | G01N 29/4427 |
| | | | | 73/622 |
| 2011/0023609 | A1* | 2/2011 | Ume | G01N 29/11 |
| | | | | 73/579 |
| 2011/0023610 | A1* | 2/2011 | Ume | G01N 29/11 |
| | | | | 73/622 |
| 2015/0170662 | A1* | 6/2015 | Krishnan | G10L 19/08 |
| | | | | 704/205 |
| 2016/0313438 | A1* | 10/2016 | Hallek | G01S 15/876 |
| 2016/0315247 | A1* | 10/2016 | Boser | H10N 30/853 |
| 2018/0106893 | A1 | 4/2018 | Kim | |
| 2019/0056495 | A1* | 2/2019 | Bariant | G01S 7/524 |
| 2019/0070963 | A1* | 3/2019 | Jang | B60K 35/00 |
| 2020/0072955 | A1* | 3/2020 | Haag | G01S 15/931 |

FOREIGN PATENT DOCUMENTS

| | | | |
|---|---|---|---|
| DE | 10 2012 216 968 A1 | 4/2014 | |
| DE | 10 2014 201 482 A1 | 7/2015 | |
| DE | 10 2017 203 136 A1 | 8/2018 | |
| DE | 102017105043 A1 | 9/2018 | |
| DE | 102017128837 A1 | 6/2019 | |
| DE | 102018124024 A1 * | 4/2020 | ............ B60W 50/08 |
| EP | 2347231 B1 | 10/2019 | |
| WO | 2010043438 A1 | 4/2010 | |

OTHER PUBLICATIONS

Written Opinion issued in International Patent Application No. PCT/EP2021/083674 mailed on Mar. 25, 2022 (7 pages).

German Search Report issued in German Patent Application No. 10 2020 132 634.3 mailed on Sep. 22, 2021 (8 pages).

Office Action issued in corresponding CN Application No. 202180082234.3, dated Jun. 18, 2025 (21 pages with English translation).

* cited by examiner

ULTRASONIC SENSOR SYSTEM FOR A MOTOR VEHICLE AND METHOD FOR OPERATING THE ULTRASONIC SENSOR SYSTEM

The present invention relates to the field of ultrasonic sensors for motor vehicles and more specifically to an ultrasonic sensor system for a motor vehicle and to a method for operating the ultrasonic sensor system.

Ultrasonic sensors having an electroacoustic transducer arrangement for generating and detecting ultrasonic waves, which are used to measure a distance from an object in the motor vehicle environment, are known. In this case, an ultrasonic wave is emitted and an echo signal returning from the vehicle environment is captured. The distance from the object is determined based on the signal time of flight. Such measurements are used, for example, by a driving or parking assistance system of the motor vehicle.

Due to internally or externally induced changes in the electroacoustic transducer arrangement, such as an aging-dependent domain effect of a piezo element, the measurement result can be corrupted or the ultrasonic sensor can fail over time. Therefore, a plurality of ultrasonic sensors can be provided on a motor vehicle, and the measured values supplied by the individual ultrasonic sensors can be subjected to a plausibility check before they are evaluated. However, in the event of a gradual change in the electrical characteristic variables of the ultrasonic sensor, such a plausibility check can also erroneously sort out measurement results that are fundamentally usable.

EP 2 347 231 B1 teaches a function monitoring apparatus that determines an impedance characteristic curve of an ultrasonic sensor on the basis of an excitation frequency. When determining the impedance characteristic curve, the ultrasonic sensor is excited with a smaller and constant amplitude compared to normal measurement operation.

DE 10 2012 216 968 A1 teaches that an electrical impedance of an ultrasonic transducer is measured by means of a test signal and changes in the impedance over the frequency of the test signal are compared with a reference with regard to extreme points present in the impedance profile. The test signal has an amplitude that differs from the amplitude used to measure the distance.

DE 10 2014 201 482 A1 teaches that an impedance curve of an ultrasonic transducer is determined with a sweep of an excitation signal over a specified frequency range with a constant voltage amplitude.

DE 10 2017 203 136 A1 teaches a monitoring unit of a sound sensor that measures an impedance of a sound transducer for different excitation frequencies. The sound transducer is excited in this case with amplitudes that are preferably one or more powers of ten smaller than the amplitudes used to measure the distance.

Against this background, the present invention is based on the object of improving the determination of the state of an ultrasonic sensor.

Accordingly, an ultrasonic sensor system for a motor vehicle is proposed. The proposed ultrasonic sensor system comprises an ultrasonic sensor with an electroacoustic transducer arrangement for generating and detecting ultrasonic waves and an electrical test device which is configured to output an electrical test signal to the electroacoustic transducer arrangement and to capture an electrical response signal from the electroacoustic transducer arrangement to the electrical test signal. The proposed ultrasonic sensor system also comprises a test control device which is configured to use the electrical test device to capture a characteristic variable of the electrical response signal, while varying a frequency and an amplitude of the electrical test signal at a plurality of measurement points.

The electroacoustic transducer arrangement can in particular comprise an ultrasonic membrane, a sound transducer device that is attached to the ultrasonic membrane and has a mechanical-capacitive, mechanical-resistive, magnetostrictive or electrostrictive operating principle, such as a piezo element, and a coupling circuit for matching the impedance of the sound transducer device.

In particular, such an electroacoustic transducer arrangement can be understood as a non-linear electrical arrangement with a resistive, an inductive and a capacitive component.

The proposed capture of an electrical characteristic variable at a plurality of measurement points, while varying not only the frequency but also the amplitude of the test signal, can advantageously be used to capture at least sections of a multi-dimensional characteristic diagram of the electroacoustic transducer arrangement, and thus to take into account, in particular, a non-linear amplitude dependency of the characteristic variable.

As a result of such consideration of the amplitude dependency of the electrical characteristic variables of the electroacoustic transducer arrangement, a significantly improved characterization of the state of the ultrasonic sensor may be possible and accordingly a superordinate control apparatus of the motor vehicle can react much better to changes in the state of the ultrasonic sensor.

The term "measurement point" can denote in particular a specific combination of precisely one frequency and precisely one amplitude of the test signal.

Accordingly, the test control device can, in particular, capture a plurality of of characteristic variables, one for each measurement point. The characteristic variables captured at the plurality of measurement points can in particular form a characteristic curve or a two-dimensional or multi-dimensional characteristic diagram of the electroacoustic transducer arrangement of the ultrasonic sensor.

The electrical test signal can in particular be an oscillation of an electrical characteristic variable applied to the electroacoustic transducer arrangement, such as current or voltage, with a defined amplitude and a defined frequency. The amplitude and the frequency of the test signal can be constant at each of the measurement points, in particular for a period in which the characteristic variable of the response signal is captured at the measurement point.

In particular, the electrical response signal can be an oscillation of one of the characteristic variables, such as voltage or current, which is captured at the electroacoustic transducer arrangement while the electrical test signal is being applied to the electroacoustic transducer arrangement.

The electrical test device can be formed by an electrical circuit which is provided in the ultrasonic sensor and can be controlled by the test control device to generate the electrical test signal with a frequency and amplitude specified in each case by the test control device and can be used by the test control device to capture the electrical response signal.

The test control device can be integrated into the ultrasonic sensor or can be provided outside the ultrasonic sensor.

The test control device can be formed in particular by an application-specific integrated circuit (ASIC), a microprocessor, an electronic control unit (ECU) or the like.

The capture of the characteristic variable at the plurality of measurement points, while varying the frequency and the amplitude of the test signal, by means of the test control device can also be referred to as "test operation" of the ultrasonic sensor. Controlling the electroacoustic transducer arrangement to generate ultrasonic waves and subsequently capturing reflected ultrasonic waves for the purpose of measuring the distance can also be referred to as "measurement operation" of the ultrasonic sensor.

According to one embodiment, the electrical test signal is a constant-current signal and the respective characteristic variable comprises an amplitude and/or a phase angle of the voltage of the response signal at the frequency and amplitude of the electrical test signal at the respective measurement point.

One or more characteristic variables can thus be captured at each measurement point. At least the amplitude of the voltage of the response signal is preferably captured. In addition, the phase angle of the voltage of the response signal is particularly preferably also captured. In this way, the real-value and the complex-value portions of the response of the electroacoustic transducer arrangement can advantageously be completely captured.

By selecting a constant-current signal (signal with a constant current amplitude), the testing operation of the ultrasonic sensor can advantageously take place under the same conditions as current-controlled measurement operation of the ultrasonic sensor.

However, as an alternative to this, it is also envisaged that the electrical test signal can be a constant-voltage signal and the respective characteristic variable can accordingly be an amplitude and/or a phase angle of the current intensity of the response signal at the frequency and amplitude of the electrical test signal at the respective measurement point.

According to a further embodiment, the plurality of measurement points of the test signal are selected to correspond to operating points of a control signal for the ultrasonic sensor while a distance measurement is being carried out.

This means that the testing operation of the ultrasonic sensor can be carried out with the same frequencies and amplitudes of the test signal that are also used for the control signal during measurement operation of the ultrasonic sensor.

In this way, the characteristic diagram captured during testing operation (the characteristic variables captured at the plurality of measurement locations) can advantageously characterize the resistive, inductive and capacitive properties of the electroacoustic transducer arrangement at the amplitudes and frequencies that are relevant to measurement operation. The characterization obtained in this way can advantageously be used to adjust parameters of the measurement operation and thus enable continued use of an ultrasonic sensor with an operating behavior that has changed over time.

According to a further embodiment, the plurality of measurement points each comprise exactly one measurement point for a number of different frequencies within a frequency range. Here, the amplitude of the respective measurement point is selected on the basis of the frequency of the measurement point.

In particular, accordingly, the plurality of measurement points cannot cover the entire characteristic diagram, but can advantageously be selected along a, in particular non-straight, in particular non-linear, one-dimensional path through the characteristic diagram of the ultrasonic sensor.

It would certainly be theoretically conceivable to completely test a specified frequency range and a specified amplitude range during testing operation and thus to determine a complete characteristic diagram of the ultrasonic sensor. However, the test during testing operation can be completed within a shorter time if only exactly one measurement point is captured for each of the number of different frequencies. In particular, the testing operation can thus take place in a pause between two measurement cycles of the measurement operation of the ultrasonic sensor, without the measurement operation of the ultrasonic sensor having to be interrupted for the test. An "online test" can therefore be made possible.

The amplitude of the respective measurement point can preferably be selected in this case to be that amplitude with which a control signal is applied to the electroacoustic transducer arrangement during measurement operation at the same frequency. Thus, advantageously, only the characteristic variables relevant to measurement operation can be captured.

The frequency range can be selected according to the requirements of measurement operation. The frequency range can in particular include a frequency of 50 kHz. The frequency range can particularly preferably cover a range from 40 kHz to 60 kHz and very particularly preferably from 30 to 70 kHz.

According to a further embodiment, the plurality of measurement points within the frequency range are chosen to be closer together in a first frequency section, in which a high gradient of the characteristic variable to be captured was determined during a previous test of the electroacoustic transducer arrangement, than in a frequency section in which a lower gradient than the high gradient was determined.

In this context, the "previous test" can relate in particular to actual execution of the testing operation. In particular, the "previous test" can relate to the last execution of the testing operation. In this way, that frequency section in which the measurement points are chosen to be closer together can be adaptively adjusted over the service life of the ultrasonic sensor to the areas of the characteristic diagram in which non-linearities were detected. As an alternative to this, the "previous test" can relate to the testing operation being carried out during the manufacture of the ultrasonic sensor. However, the "previous test" can in particular also relate to a theoretical determination of the characteristic diagram and thus to a target characteristic diagram, i.e. the measurement points could be chosen to be close together where non-linearities in the response of the electroacoustic transducer arrangement are expected.

Accordingly, the number of measurements to be carried out and thus the time interval required for testing operation can advantageously be further reduced and/or the accuracy with which the characteristic diagram is determined in a region of interest can be increased.

According to a further embodiment, of the amplitudes of in each case two measurement points at adjacent frequencies within the frequency range, one amplitude is selected at a lower limit and the other amplitude is selected at an upper limit of an amplitude range selected on the basis of the adjacent frequencies.

The amplitude range for the respective frequency can be selected in particular, for example, in such a way that it covers a predetermined tolerance range around that amplitude with which a control signal is applied to the electroacoustic transducer arrangement at the same frequency during measurement operation.

In particular, the plurality of measurement points can accordingly advantageously be selected along two one-dimensional paths through the characteristic diagram of the ultrasonic sensor, which describe boundaries of a two-dimensional band within the characteristic diagram, although only one measurement needs to be carried out for each frequency of the number of frequencies (only one characteristic variable is captured).

According to a further embodiment, the test control device is configured to report a state of the electroacoustic transducer arrangement to a control apparatus of the motor vehicle on the basis of the plurality of characteristic variables captured by the test control device.

In particular, the test control device can evaluate the plurality of captured characteristic variables and, depending on a result of this evaluation, can report either an error state or, for example, a "ready for operation" state to the control apparatus of the motor vehicle. In particular, the report to the control apparatus can also be given only if an error state has been detected.

For example, the test control device can compare the captured characteristic variables, which describe a characteristic curve or a multi-dimensional characteristic diagram, with a target characteristic curve or a target characteristic diagram, and can determine the error state or the "ready for operation" state based on the result of the comparison.

Accordingly, the control apparatus of the motor vehicle can exclude a faulty ultrasonic sensor from the environment measurement and/or can output an error message to an operator or a maintenance person of the vehicle.

According to a further embodiment, the ultrasonic sensor system also comprises a measurement control device which is configured to excite the electroacoustic transducer arrangement to emit an ultrasonic wave by applying an electrical control signal and to carry out a distance measurement by subsequently capturing and evaluating an electrical detection signal from the electroacoustic transducer arrangement. In this case, the measurement control device is configured to carry out the distance measurement on the basis of the plurality of characteristic variables captured by the test control device.

The measurement control device can be integrated into the ultrasonic sensor or can be provided outside the ultrasonic sensor.

The measurement control device can be formed in particular by an application-specific integrated circuit (ASIC), a microprocessor, an electronic control unit (ECU) or the like.

The electrical control signal can in particular be a constant-current signal with a constant frequency. However, it is also conceivable and preferred for a sweep to be carried out over a predefined frequency range.

An "electrical detection signal" can be understood as meaning in particular that signal which is returned to the measurement control device by the electroacoustic transducer arrangement. The electrical detection signal may comprise echo signals (echo signal pulse) when an ultrasonic wave is incident on the electroacoustic transducer arrangement (an ultrasonic membrane thereof) and is converted into such an echo signal pulse by the electroacoustic transducer arrangement (a piezo element or the like thereof).

During measurement operation, it is possible to determine the echo signals in the detection signal. A distance from an obstacle in the motor vehicle environment can be inferred on the basis of time of flight differences between the application of the electrical control signal and the occurrence of the echo signal in the detection signal.

In particular, the following can be adjusted on the basis of the characteristic variables captured by the test control device: the control signal (a frequency, a frequency range and/or an amplitude thereof) and/or a threshold value for determining the echo signal in the detection signal and/or a gain factor with which the detection signal is amplified before the echo signal is determined therein.

If, according to the proposal, the electrical characteristic variables (the electrical characteristic diagram of the electroacoustic transducer arrangement) are known and are taken into account when carrying out the distance measurements, the reliability and the accuracy of the distance measurement can advantageously be improved.

According to a further embodiment, the ultrasonic sensor comprises the test control device.

The ultrasonic sensor preferably also comprises the measurement control device. Particularly preferably, the test control device, and possibly also the measurement control device, can be designed as sections of an application-specific integrated circuit (ASIC) arranged on a printed circuit board in a housing of the ultrasonic sensor.

Accordingly, an ultrasonic sensor with a longer service life and/or improved constancy of the measurement quality over the service life can advantageously be provided.

According to a second aspect, a motor vehicle having at least one ultrasonic sensor system as described above is proposed.

The features, advantages and embodiments described for the ultrasonic sensor system of the first aspect also apply correspondingly to the motor vehicle of the second aspect.

The motor vehicle can be, in particular, a passenger vehicle or a truck. The motor vehicle may have an assistance system, such as a driving assistance system or a parking assistance system, which can be configured in particular for semi-autonomous or fully autonomous driving of the vehicle. Semi-autonomous driving is understood to mean, for example, that the assistance system controls a steering apparatus and/or an automatic gear selection system. Fully autonomous driving is understood to mean, for example, that the assistance system additionally also controls a drive device and a braking device. The assistance system may be implemented in the form of hardware and/or in the form of software. In the case of an implementation in the form of hardware, the assistance system may be, for example, in the form of a computer or a microprocessor. In the case of an implementation in the form of software, the assistance system may be in the form of a computer program product, a function, a routine, part of a program code, or an executable object. In particular, the assistance system may be in the form of part of a superordinate control system of the vehicle, for example an ECU (Engine Control Unit). The assistance system can use the proposed ultrasonic sensor system to monitor or measure an environment of the motor vehicle by means of ultrasonic measurements using the pulse-echo method.

According to one embodiment of this aspect, the respective ultrasonic sensor respectively comprises a test control device and a measurement control device. According to another embodiment of this aspect, the proposed test control device can be provided only once centrally in a control apparatus of the motor vehicle and can control the testing operation of each of a plurality of the ultrasonic sensors.

According to a second aspect, a method for operating an ultrasonic sensor system for a motor vehicle is proposed, which comprises an ultrasonic sensor with an electroacoustic transducer arrangement for generating and detecting ultrasonic waves and an electrical test device and also comprises a test control device. The method comprises the steps of: outputting an electrical test signal to the electroacoustic transducer arrangement by means of the test device; capturing an electrical response signal from the electroacoustic transducer arrangement by means of the test device;

and capturing, a characteristic variable of the electrical response signal at a plurality of measurement points by means of the test control device, while varying a frequency and an amplitude of the electrical test signal.

The features, advantages and embodiments described for the ultrasonic sensor system of the first aspect also apply correspondingly to the method of the third aspect.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred exemplary embodiments with reference to the accompanying figures.

Identical or functionally identical elements have been provided with the same reference signs in the figures, unless stated otherwise.

Figure 1:
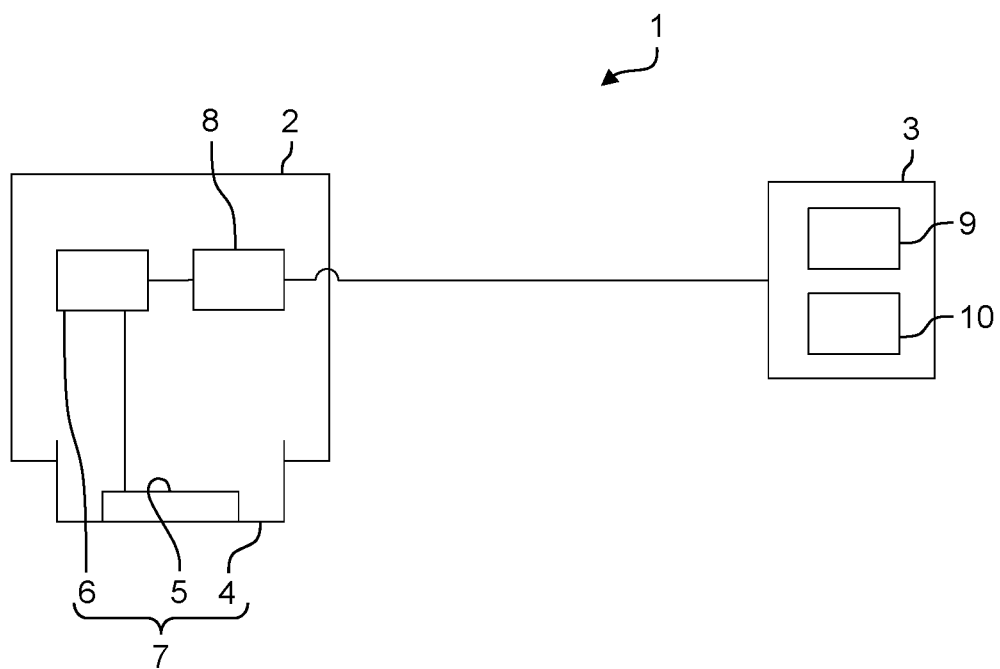
FIG. 1 shows a schematic diagram of an ultrasonic sensor system according to a first exemplary embodiment.

FIG. 1 shows a schematic diagram of an ultrasonic sensor system 1 according to a first exemplary embodiment. The ultrasonic sensor system 1 is formed from an ultrasonic sensor 2 and at least one section of a control device 3. The control device 3 can be, for example, an electronic control unit (ECU) of a motor vehicle (11 in FIG. 3; not shown in FIG. 1).

In the diagram from FIG. 1, which is to be understood as fundamentally purely functional, an external shape of a housing of the ultrasonic sensor 2 is indicated schematically. An ultrasonic membrane 4, indicated as a membrane pot in FIG. 1, is attached to a lower side of the housing of the ultrasonic sensor 2 in FIG. 1. A piezo element 5 (example of a sound transducer element) is attached, for example adhesively bonded, to an inside of the ultrasonic membrane 4. The piezo element 5 is electrically connected to a coupling circuit 6. The coupling circuit is used for impedance matching. The arrangement of ultrasonic membrane 4, piezo element 5 and coupling circuit 6 is an example of an electroacoustic transducer arrangement 7.

A control unit 8 arranged in the housing of the ultrasonic sensor 2 is configured to apply analog electrical oscillating signals to the electroacoustic transducer arrangement 7 and to capture analog electrical oscillating signals applied to the control unit 8 by the electroacoustic transducer arrangement.

The control device 3, which is arranged outside the ultrasonic sensor 2, comprises a measurement control device 9 and a test control device 10.

During measurement operation of the ultrasonic sensor 2, the measurement control device 9 exchanges control signals, preferably digital signals, with the sensor-internal control unit 8. In particular, the measurement control device 9 can in this way cause the control unit 8 to apply an, in particular analog, in particular oscillating, electrical control signal to the electroacoustic transducer arrangement 7. By means of the piezo element 5, the control signal excites the ultrasonic membrane 4 to oscillate, so that an ultrasonic wave is emitted. The measurement control device 9 then causes the control unit 8 to capture an electrical detection signal supplied by the electroacoustic transducer arrangement 7 over a predetermined period of time. When an ultrasonic wave reflected from an environment is incident on the ultrasonic membrane 4 and causes it to vibrate, the piezo element 5 generates an echo signal (an echo signal pulse) in the electrical detection signal. The detection signal is captured by the sensor-internal control unit 8 and transmitted to the measurement control device 9, preferably in digital form. The measurement control device 9 evaluates the detection signal captured in this way, identifies the echo signal, and uses a time difference between the emission of the ultrasonic signal and the occurrence of the echo signal and the known speed of sound to determine a distance from an obstacle in an environment of the ultrasonic sensor 2.

The electroacoustic transducer arrangement 7 can be understood as an electrical arrangement with resistive, capacitive and inductive properties. If these properties change, in particular due to aging effects of the piezo element 5 or also due to contamination and the like, there may be a mismatch in the control of the electroacoustic transducer arrangement 7 and/or the capture of the detection signals from the electroacoustic transducer arrangement 7, which can impair the measurement quality.

Figure 4:
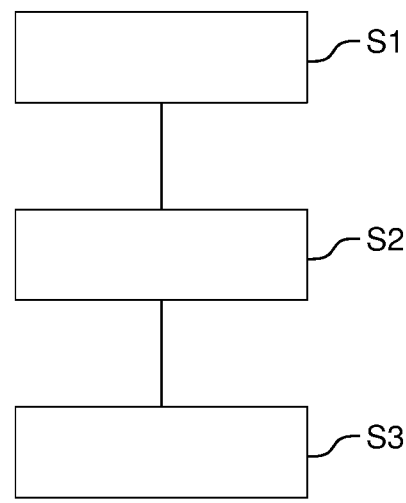
FIG. 4 shows steps of a method for performing testing operation according to exemplary embodiments.

Therefore, during testing operation of the ultrasonic sensor 2, the test control device 10 of the control device 3 carries out the steps illustrated schematically in FIG. 4. Reference is made to FIG. 1 in conjunction with FIG. 4.

In step S1, the measurement control device 10 exchanges control signals, preferably digital signals, with the sensor-internal control unit 8. In particular, the test control device 10 can in this way cause the sensor-internal control unit 8 (in this case an example of a "test device") to apply an, in particular analog, in particular oscillating, electrical test signal to the electroacoustic transducer arrangement 7.

While the test signal is applied to the electroacoustic transducer arrangement 7 in this way, the test control device 9 captures in step S2 a preferably digital signal which is transmitted by the sensor-internal control circuit 8 ("test device") and is indicative of a preferably analog, preferably oscillating, electrical response signal from the electroacoustic transducer arrangement 7 to the application of the test signal.

In step S3, the test control device 10 captures a characteristic variable of the electrical response signal.

In this case, the test signal can be a constant-current signal (an alternating current signal with a constant current amplitude) and the electrical response signal can accordingly be a voltage signal that occurs when the test signal is applied to the electroacoustic transducer arrangement 7. In this case, the captured characteristic variable is a voltage amplitude and optionally a phase angle of the electrical response signal.

However, the test signal can also be a constant-voltage signal and the electrical response signal can accordingly be a current signal. In this case, the captured characteristic variable can comprise a current amplitude and optionally a phase angle of the electrical response signal.

According to the proposal, a frequency and an amplitude of the test signal are varied in this case. This means that a plurality of measurement points are run through at a plurality of different frequencies and different amplitudes, and a corresponding characteristic variable is captured at each of the measurement points.

The advantages and details of varying the frequency and amplitude will be explained in more detail below with reference to FIGS. 5 and 6; structural alternatives to the arrangement from FIG. 1 are described first of all.

Figure 2:
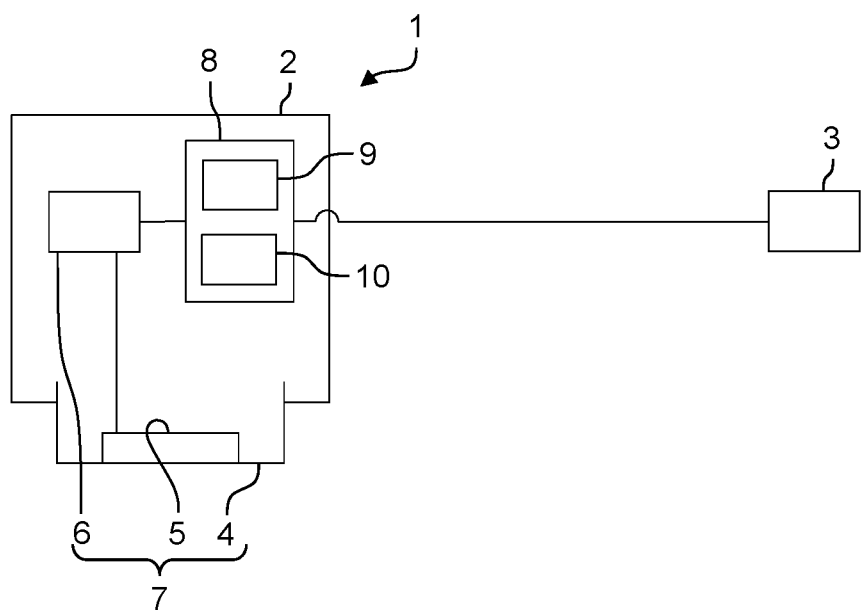
FIG. 2 shows a schematic diagram of an ultrasonic sensor system according to a second exemplary embodiment.

FIG. 2 shows a schematic diagram of an ultrasonic sensor system 1 according to a second exemplary embodiment. In the second exemplary embodiment, the functionality of the measurement control device 9 and the functionality of the test control device 10 as well as the functionality of the electroacoustic transducer arrangement 7 (coupling circuit 6, ultrasonic membrane 4 and piezo element 5) are the same as in the first exemplary embodiment, but the measurement control device 9 and the test control device 10 are formed as sections of the sensor-internal control unit 8, and not as sections of the external control device 3.

Accordingly, in the second exemplary embodiment, the external control device 3 does not form part of the proposed ultrasonic system 1; instead, the ultrasonic system 1 in the second exemplary embodiment is implemented entirely by the ultrasonic sensor 2.

Accordingly, there is no need to exchange digital control signals with the control device 3 in order to perform measurement operation and testing operation. Accordingly, only measurement results of the distance measurement and/or status information determined from the captured characteristic variables can be transmitted to the control device 3 via the ultrasonic sensor 2; moreover, the captured characteristic variables can be used inside the sensor to improve the control of the electroacoustic transducer arrangement 7 during measurement operation.

The sensor-internal control unit 8 can be in particular an application-specific integrated circuit (ASIC) arranged in the housing of the ultrasonic sensor 2 on a printed circuit board (not shown).

Figure 3:
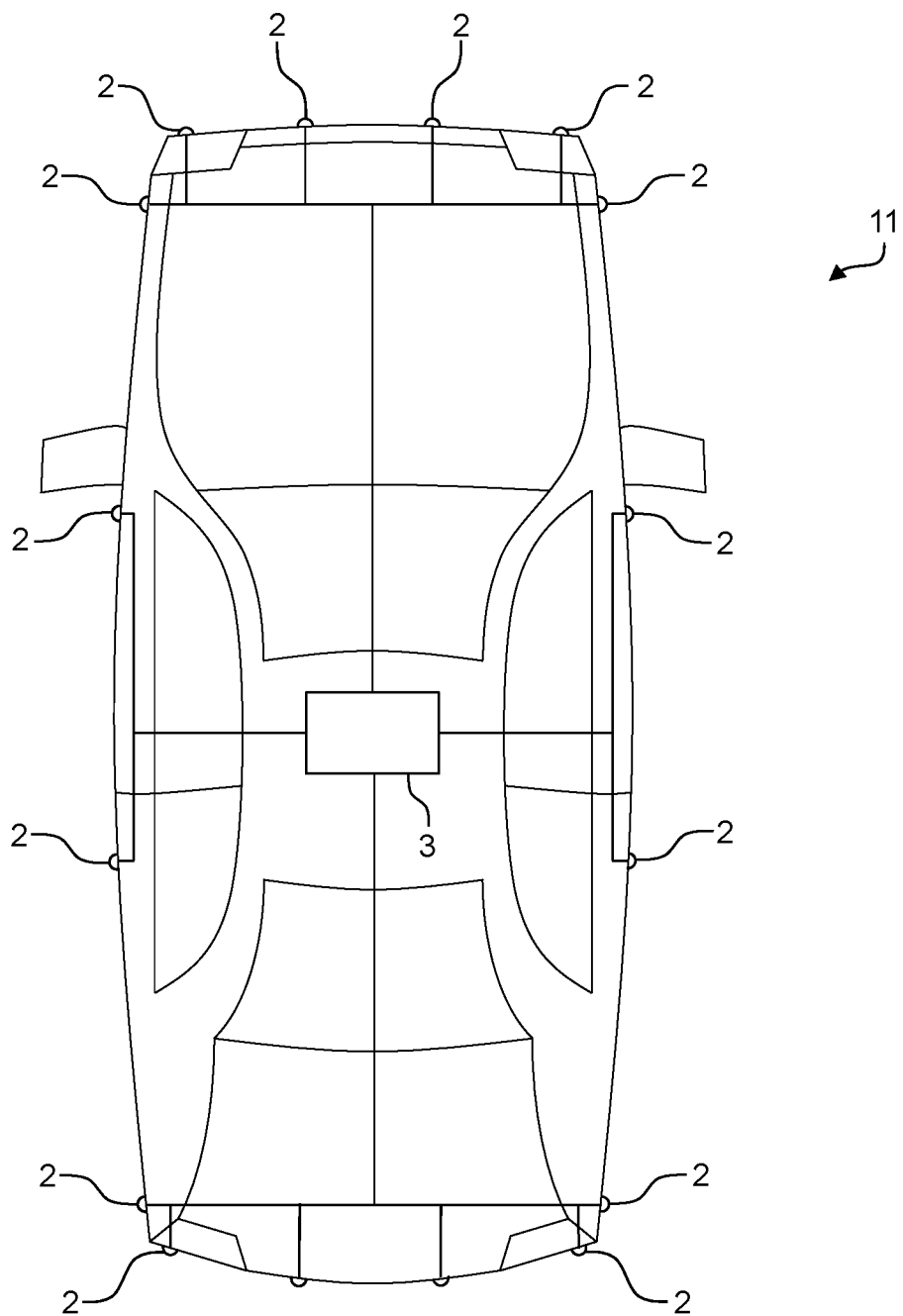
FIG. 3 shows a schematic diagram of a vehicle having a number of ultrasonic sensor systems according to a third exemplary embodiment.

FIG. 3 shows a schematic diagram of a vehicle 11 having a number of ultrasonic sensors 2 and a control device 3 according to a third exemplary embodiment. The ultrasonic sensors 2 are arranged along a left-hand side, a right-hand side, and also along a front bumper and along a rear bumper of the vehicle 11.

The third exemplary embodiment can be combined with both the first and the second exemplary embodiment. In other words, according to one variant, each of the ultrasonic sensors 2 shown in FIG. 3 can have an integrated test control device 10 (FIG. 2) and can thus represent an ultrasonic sensor system 1 (FIG. 2). The vehicle 11 shown can accordingly have, for example, twelve independent ultrasonic sensor systems 1 (FIG. 2). The control device 3 can use the ultrasonic sensor systems 1 (FIG. 2) to measure a vehicle environment and can use the information obtained to provide a driving or parking assistance functionality.

According to another variant, a proposed test control device 10 (FIG. 1) and optionally also a measurement control device 9 (FIG. 1) can be provided in the control device 3 of the vehicle 11. Thus, the plurality of ultrasonic sensors 2 and the control device 3 can together form an ultrasonic sensor system 1 (FIG. 1) with a plurality of ultrasonic sensors 2. In this case, the functionality of the test control device 10 (FIG. 1) of the control device 3 only needs to be configured once and the test control device 10 (FIG. 1) can centrally evaluate all captured characteristic variables of the electroacoustic transducer arrangements 7 (FIG. 1) and can take them into account when controlling measurement operation.

Figure 5:
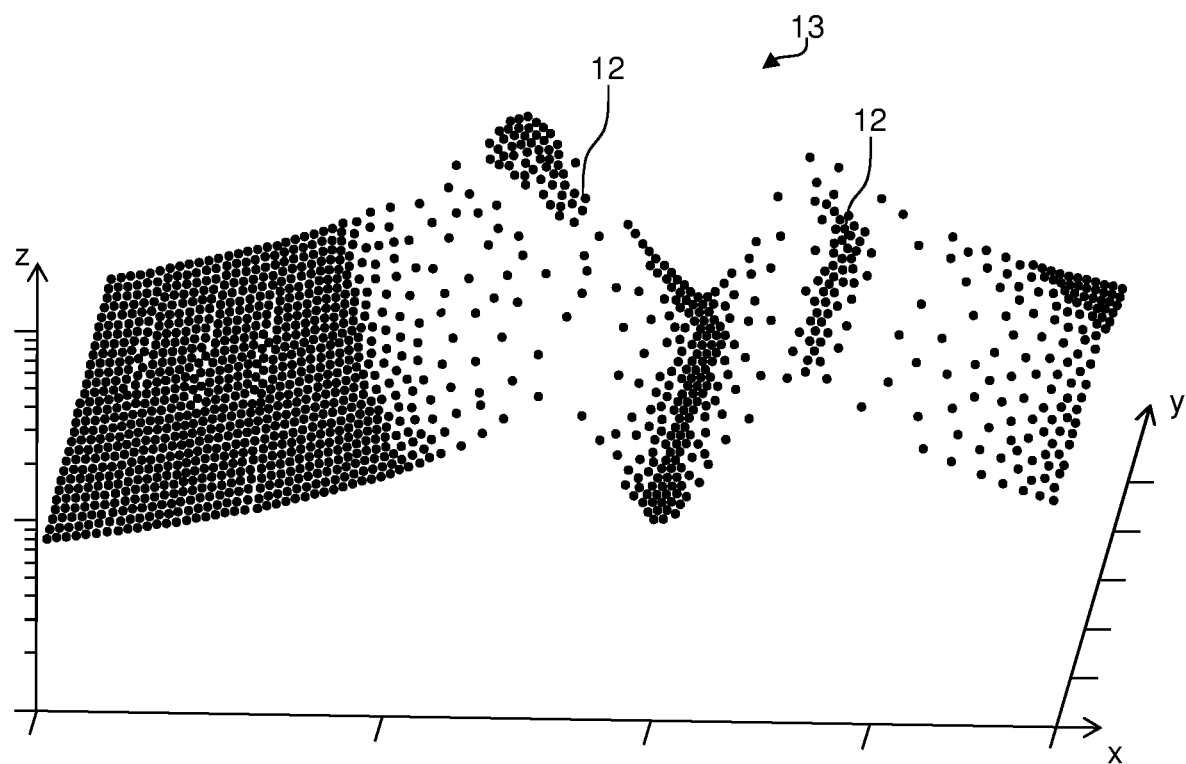
FIG. 5 shows a three-dimensional plot of an exemplary characteristic diagram of an ultrasonic sensor.

FIG. 5 shows a three-dimensional plot of an exemplary characteristic diagram of an ultrasonic sensor. Reference is made to FIG. 5 and also to FIGS. 1 and 2 where necessary.

The characteristic diagram 13 in FIG. 5 is made up of measurement points (not individually labeled due to their large number) which were captured with an ultrasonic sensor system 1 during very comprehensive testing operation. The frequency of a constant-current test signal is plotted along an axis labeled "x", the amplitude of the current intensity of the constant-current test signal is plotted along an axis labeled "y", and the amplitude of the voltage of the captured response signal is plotted along an axis labeled "z".

Two peaks 12 of the characteristic diagram 13, at which the amplitude of the characteristic diagram increases sharply, can be seen in the characteristic diagram 13 in FIG. 5. It can also be seen that the peaks 12 show a pronounced dependence on amplitude—their frequency position shifts toward lower frequencies as the amplitude increases. These non-linearities result from a domain effect that is inherent in the piezo element 5.

A central idea of the proposed solution is that the electrical characteristic variables of an ultrasonic sensor 2 can be better captured if this is carried out not only at different frequencies, but also at different amplitudes, and in particular at the amplitudes that are actually relevant to the measurement operation of the ultrasonic sensor.

However, capturing the entire characteristic diagram 13 shown in FIG. 5 requires varying both the frequencies and the amplitudes of the test signal, each over their entire range of values in all possible combinations, and accordingly a large amount of measurements and accordingly a lot of time and energy. However, it is desirable to carry out testing operation "online", i.e. without or without any significant interruption in measurement operation.

A preferred way of capturing the electrical characteristic variables of the electroacoustic transducer arrangement 7, which can be implemented in exemplary embodiments by the test control device 10 (FIGS. 1, 2), is therefore explained with reference to FIG. 6—with further reference also to FIGS. 1 and 2.

Figure 6:
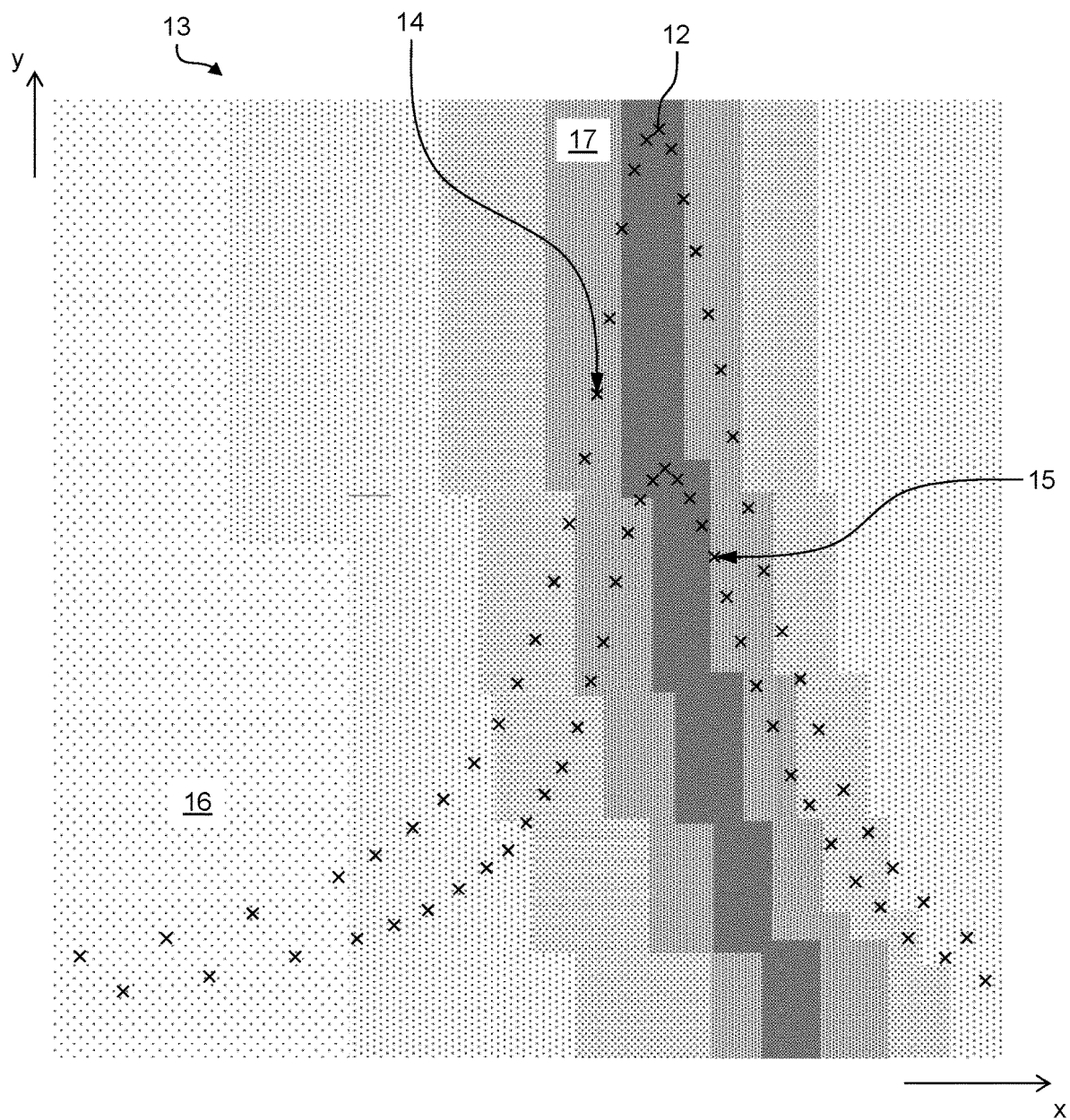
FIG. 6 shows a two-dimensional plot of a further exemplary characteristic diagram of an ultrasonic sensor with measurement points entered therein.

FIG. 6 shows a two-dimensional plot of a further exemplary characteristic diagram 13 of an ultrasonic sensor 2. In FIG. 6, the frequency of the test signal is plotted along the "x" axis and the amplitude of the test signal is plotted along the "y" axis, as in FIG. 5. The amplitude of the response signal is represented by shading in FIG. 6, wherein the darker the shading, the higher the amplitude of the response signal. In particular, a theoretical and/or a complete characteristic diagram 13 of the electroacoustic transducer arrangement determined in extensive experiments similar to that in FIG. 5 is shown by shading in FIG. 6.

It should be noted that a sweep can take place over a defined frequency range during measurement operation, that is to say measurement operation does not necessarily take place at exactly one frequency and exactly one amplitude, but can advantageously take place along a working curve (not shown) in the characteristic diagram 13 from FIG. 6.

FIG. 6 also shows measurement points 14, 15 of the characteristic diagram which are actually captured by the test control device 10 according to the exemplary embodiment during testing operation.

This means that, during testing operation, the test control device 10 varies the frequency of the test signal in such a way that a number of individual frequency support points at the frequencies of the measurement points 14, 15 shown in FIG. 6 are passed through one after the other. Exactly one measurement point is captured for each frequency in this case, and an amplitude dependent on the frequency is selected for each such measurement point. The amplitude is selected (varied) in this case in such a way that the respective amplitude is related to an amplitude of the control signal at the respective frequency during the frequency sweep of measurement operation.

According to one exemplary embodiment, only the measurement points labeled 14 or only the measurement points labeled 15 are captured and essentially correspond to points on a working curve of the control signal during measurement operation.

According to a particularly preferred exemplary embodiment, however, both the measurement points labeled 14 and the measurement points labeled 15 are captured, and a working curve of the amplitudes of the control signal can run through the characteristic diagram between the paths defined by the measurement points 14 and 15. That is, the measurement points 14, 15 are selected in such a way that, for every two adjacent measurement points 14, 15, one measurement point 15 is selected at a lower limit of an amplitude range and a second measurement point 16 is selected at an upper limit of an amplitude range, the amplitude range being centered around an amplitude of the control signal during measurement operation, for example at one of the frequencies or at a midpoint between the two frequencies. With only one frequency sweep of the test signal in FIG. 6, this results in a first path 14 and a second path 15 through the characteristic diagram, which together delimit a two-dimensional band through the characteristic diagram. The upper and lower limits of the electrical characteristic variables relevant to measurement operation can thus be estimated in a particularly realistic manner.

In addition, FIG. 6 illustrates a particularly preferred exemplary embodiment, in which the measurement points in a first frequency range 16, in which a gradient of the amplitude of the response signal is low, are selected to be further apart than the measurement points 14, 15 in a second frequency range 17 in the vicinity of the peak 12, in which a gradient of the amplitude of the response signal is high. Accordingly, the number of points to be captured during test operation can be further reduced, particularly in the range 16.

According to the measures described above, it can thus advantageously be possible to realistically estimate the properties of the two-dimensional characteristic diagram of the amplitudes of the response signal in a range relevant to measurement operation with just a few individual measurements at the measurement points 14 and 15 selected specifically on the basis of the frequency. As a result, it is possible to quickly capture the characteristic diagram or the characteristic variables at the measurement points 14, 15, which can be carried out, for example, between two measurement cycles of the measurement operation, without having to interrupt the measurement operation.

Various ways are envisaged as to how the characteristic variables captured in this way (amplitude and possibly phase angles of the electrical response signal that occur when the electrical test signal is applied to the measurement points 14, 15) can be evaluated by the test control device 10.

For example, a height of the peaks 12 (FIGS. 5, 6), a frequency position of the peaks 12 (FIGS. 5, 6) or the ratio of the peak heights to one another can change over the course of the operating time of the ultrasonic sensor 12. The named parameters of the peaks 12 can also be easily determined with a simple test control device 10, as can be implemented by means of an application-specific circuit (ASIC) 8 (FIG. 2) or a motor vehicle control device (ECU) 3 (FIG. 1). The test control device 10 can determine a degree of change in the peak heights or positions compared to a reference state and can use this to assess a state of the ultrasonic sensor 10. If the state of the ultrasonic sensor 2 is judged to be faulty, the ultrasonic sensor 2, for example in the exemplary embodiment shown in FIG. 3, can be excluded (no longer taken into account) from the environment measurement by the control device 3. The control device 3 can output a corresponding warning message to a driver or a maintenance person.

However, it is also conceivable that no faulty state is recognized on the basis of the changed peak positions determined, but rather the measurement operation (the distance measurement) is adjusted.

It is thus conceivable that the test control device 10 provides the measurement control device 9 with an evaluation of the captured characteristic variables (e.g. information about shifted positions and/or heights of the peaks 12) and, depending on this, the measurement control device 9 causes the control unit 8 of the ultrasonic sensor 2, for example, to increase an amplitude of the control signal during measurement operation, to adjust a frequency position or a frequency range of a sweep of the control signal during measurement operation, to amplify the detection signal during measurement operation or to adjust a threshold parameter for capturing echo signals in the detection signal. Accordingly, the measurement control device 9 can carry out the distance measurement on the basis of the plurality of characteristic variables captured by the test control device 10. Thus, advantageously, a high measurement quality can be maintained over longer periods of operation, even if electrical properties, such as resistive, inductive and/or capacitive properties, of the electroacoustic transducer arrangement 7 change over time.

It is also conceivable that the test control device 10, in addition to the amplitude of the response signal as a further characteristic variable, also captures a phase angle of the response signal relative to a phase angle of the test signal as a further characteristic variable and incorporates this into the assessment of the state of the ultrasonic sensor 2 and/or into the adjustment of the measurement operation of the measurement control device 9. In particular, the inductive and capacitive properties of the electrical transducer arrangement 7 can be captured and evaluated on the basis of the phase angle. The information obtained in this way can also be used, for example, to adjust parameters of a resonant circuit comprised by the coupling circuit 6 and thus improve impedance matching to the impedance of the electrical transducer arrangement 7 at the relevant frequencies and amplitudes of the control signal.

The measures described above for reporting an error state of the ultrasonic sensor 2 and/or for adjusting the measurement operation are advantageously carried out using characteristic variables that were captured at amplitudes of the test signal that correspond to the amplitudes of the control signal at the respectively relevant frequencies during measurement operation or are related to these amplitudes and can therefore have a higher relevance or quality than characteristic variables that are captured at low or other or constant amplitudes of the test signal.

Although the present invention has been described on the basis of exemplary embodiments, it may be modified in many ways.

A piezo element 5 was described in the exemplary embodiments; however, the electroacoustic transducer arrangement 7 can also comprise another sound transducer based on a mechanical-capacitive, mechanical-resistive, magnetostrictive or electrostrictive operating principle.

LIST OF REFERENCE SIGNS

1 Ultrasonic sensor system
2 Ultrasonic sensor
3 Control device
4 Ultrasonic membrane
5 Piezo element (sound transducer element)
6 Coupling circuit
7 Electroacoustic transducer arrangement
8 Sensor-internal control unit (test device)
9 Measurement control device
10 Test control device
11 Motor vehicle
12 Peak
13 Characteristic diagram
14 Measurement points, first path
15 Measurement points, second path
16 Frequency range with low gradient
17 Frequency range with high gradient
x, y, z Axes of a plot
S1-S3 Method steps

The invention claimed is:

1. An ultrasonic sensor system for a motor vehicle, comprising:
   an ultrasonic sensor with an electroacoustic transducer arrangement for generating and detecting ultrasonic waves and an electrical test device which is configured to output an electrical test signal to the electroacoustic transducer arrangement and to capture an electrical response signal from the electroacoustic transducer arrangement to the electrical test signal, and
   a test control device which is configured to use the electrical test device to capture a characteristic variable of the electrical response signal, while varying a frequency and an amplitude of the electrical test signal at a plurality of measurement points,
   wherein the electrical test signal is a constant-current signal, and the characteristic variable comprises an amplitude or a phase angle of a voltage of the response signal at the frequency and amplitude of the electrical test signal at the respective measurement point.

2. The ultrasonic sensor system as claimed in claim 1, wherein the plurality of measurement points of the test signal are selected to correspond to operating points of a control signal for the ultrasonic sensor while a distance measurement is being carried out.

3. The ultrasonic sensor system as claimed in claim 1, wherein the plurality of measurement points each comprise exactly one measurement point for a number of different frequencies within a frequency range, and wherein the amplitude of the respective measurement point is selected based upon the frequency of the measurement point.

4. The ultrasonic sensor system as claimed in claim 3, wherein the plurality of measurement points within the frequency range are chosen to be closer together in a first frequency section, in which a high gradient of the characteristic variable to be captured was determined during a previous test of the electroacoustic transducer arrangement, than in a frequency section in which a lower gradient than the high gradient was determined.

5. The ultrasonic sensor system as claimed in claim 3, wherein, of the amplitudes of in each case two measurement points at adjacent frequencies within the frequency range, one amplitude is selected at a lower limit and the other amplitude is selected at an upper limit of an amplitude range selected on the basis of the adjacent frequencies.

6. The ultrasonic sensor system as claimed in claim 1, wherein the test control device is configured to report a state of the electroacoustic transducer arrangement to a control apparatus of the motor vehicle based upon a plurality of the characteristic variables captured by the test control device.

7. The ultrasonic sensor system as claimed in claim 1, further comprising:
   a measurement control device which is configured to excite the electroacoustic transducer arrangement to emit an ultrasonic wave by applying an electrical control signal and to carry out a distance measurement by subsequently capturing and evaluating an electrical detection signal from the electroacoustic transducer arrangement,
   wherein the measurement control device is configured to carry out the distance measurement based upon a plurality of the characteristic variables captured by the test control device.

8. The ultrasonic sensor system as claimed in claim 1, wherein the ultrasonic sensor comprises the test control device.

9. A motor vehicle having at least one ultrasonic sensor system as claimed in claim 1.

10. A method for operating an ultrasonic sensor system for a motor vehicle, which comprises an ultrasonic sensor with an electroacoustic transducer arrangement for generating and detecting ultrasonic waves and an electrical test device and also comprises a test control device, wherein the method comprises:
   outputting an electrical test signal to the electroacoustic transducer arrangement by means of the electrical test device;
   capturing an electrical response signal from the electroacoustic transducer arrangement by the electrical test device; and
   capturing a characteristic variable of the electrical response signal at a plurality of measurement points by the test control device, while varying a frequency and an amplitude of the electrical test signal,
   wherein the electrical test signal is a constant-current signal, and the characteristic variable comprises an amplitude or a phase angle of a voltage of the response signal at the frequency and the amplitude of the electrical test signal at a respective measurement point of the plurality of measurement points.

\* \* \* \* \*